July 13, 1954     J. S. ATWOOD     2,683,731
PROCESS FOR ABSORBING ETHYLENE IN SULFURIC ACID
Filed March 5, 1952
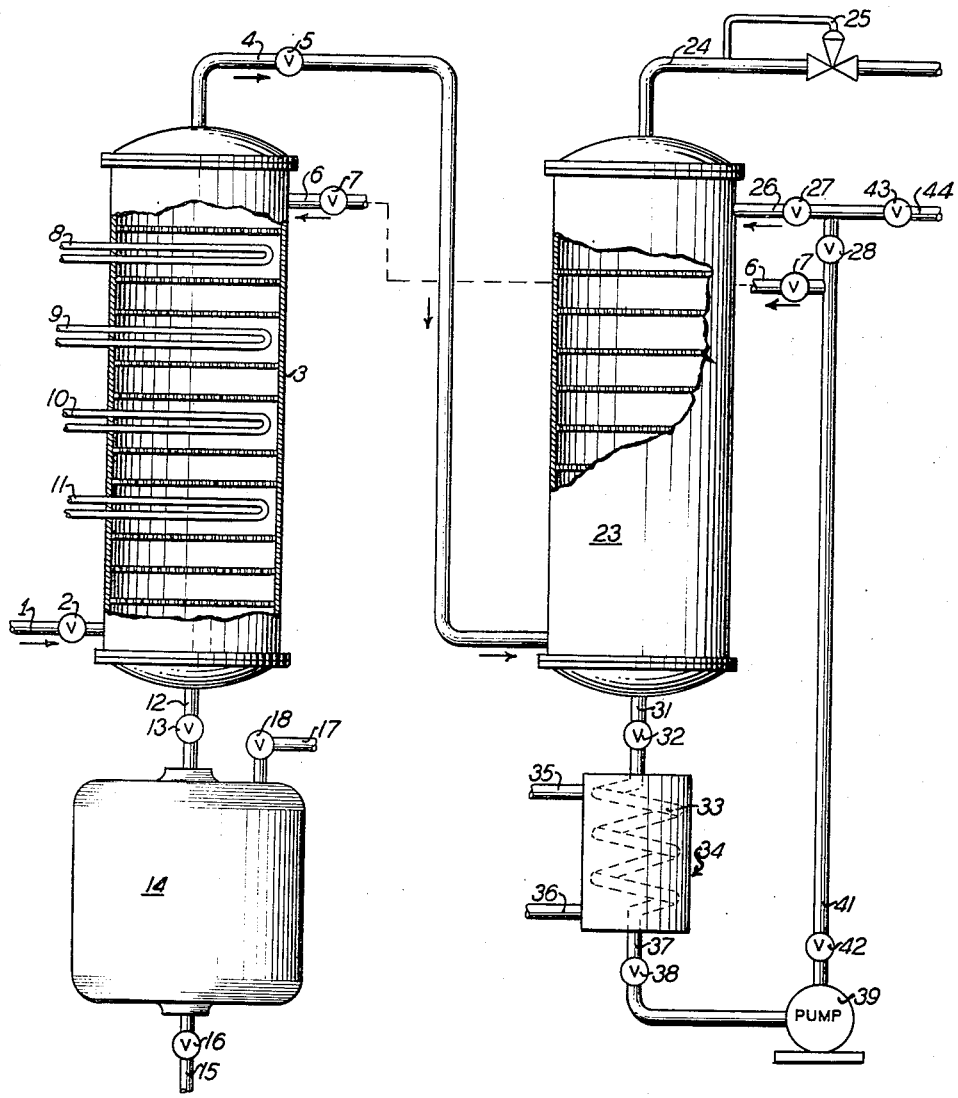
INVENTOR.
JOHN S. ATWOOD
BY Louis Burgess
ATTORNEY Patented July 13, 1954

2,683,731

UNITED STATES PATENT OFFICE 2,683,731

PROCESS FOR ABSORBING ETHYLENE IN SULFURIC ACID

John S. Atwood, Port Washington, N. Y., assignor to National Petro-Chemicals Corporation, a corporation of Delaware Application March 5, 1952, Serial No. 274,971

4 Claims. (Cl. 260—460)

This invention is a new and useful method of absorbing ethylene in sulfuric acid to form an absorbate containing both mono and diethyl sulfates. The invention is applicable to those mixtures of inert gases and ethylene which consist predominantly of ethylene and are substantially free from higher olefines. The preferred raw material contains from 80-98% of ethylene. Such gases may be commercially produced by the cracking of natural gas followed by a rectification operation to separate a close cut consisting principally of ethylene, the remainder of which is almost entirely ethane.

The invention will be illustrated by reference to the drawing which is a diagrammatic showing of apparatus in which the invention may be carried into effect. Referring to the drawing, such a gas consisting predominantly of ethylene is introduced through pipe 1 controlled by valve 2 into the lower end of the countercurrent liquid-gas contacting device 3, which in the specific case is an absorption tower. The gas passes upwardly through the absorption tower 3, the residual gas passing off from the tower through pipe 4 controlled by valve 5. As the gas moves upwardly through the tower, it flows countercurrent to the descending stream of sulfuric acid containing combined ethylene supplied to the tower through pipe 6 controlled by valve 7. As initially supplied through pipe 6, this sulfuric acid contains from 0.8-1.2 mols of ethylene per mol of sulfuric acid. The acid is introduced through pipe 6 at a temperature between 120 and 200° F. After combining with the liquid on the upper tray the temperature of the liquid as a whole will range from 160-200° F. and preferably from 170 to 190° F. Provision is made for cooling the descending stream of acid at a number of points as it flows downward within the tower diagrammatically indicated by the cooling coils 8, 9, 10 and 11, which in actual practice will of course be immersed in the liquid retained upon the corresponding trays in the tower. By suitable control of the amount of cooling liquid supplied to these coils, conditions within the absorption tower 3 are held substantially isothermal, i. e., the temperature of the acid in the upper part of the column as it descends through the tower is held within + or −10° F., and preferably within + or −5° F. Following this descent through the tower, the acid is conducted away through pipe 12 controlled by valve 13 into storage tank 14, from which it may be withdrawn, as required, for the production of ether or ethyl alcohol through the pipe 15 controlled by valve 16. Any gas evolved in the tank 14 may be withdrawn through pipe 17 controlled by valve 18. The acid passing off through pipe 12 will contain from 1.3-1.5 mols of ethylene per mol of sulfuric acid, but ordinarily between 1.35 and 1.45. The residual gas passing off from the absorption tower 3 through pipe 4 will of course run higher in inert gases than that originally introduced through pipe 1, and will ordinarily contain from 60-80% of the original ethylene content of the inlet gas supplied to tower 3, the remainder consisting of inert gases such as ethane. This gas is passed into the base of the second countercurrent liquid-gas contacting device which, as shown, consists of absorption tower 23. The residual gas from tower 23, which will ordinarily contain not more than 2-5% of the original ethylene content of the inlet gas supplied to tower 3, passes out of the system through pipe 24 controlled by a pressure release valve 25. As it moves upwardly within the tower 23, it flows countercurrent to the descending sulfuric acid supplied through pipe 26 controlled by valves 27 and 28. As initially supplied through pipe 26, this acid contains from 0.4-1.0 mol of ethylene per mol of sulfuric acid. As it flows out of the base of the tower 23, through pipe 31 controlled by valve 32, this acid will contain from 0.8-1.2 mols of ethylene per mol of sulfuric acid. Within the tower 23, the reaction which is exothermic proceeds adiabatically, the acid being supplied through pipe 26 at an initial temperature of from 100-180° F., reaching a temperature of from 160-200° F., and preferably 170-190° F. at the base of tower 23. As this passes through the coil 33 located in the cooler 34, to which a coolant liquid is supplied through pipe 35, passing off through pipe 36, it is reduced in temperature. It passes out of the cooler through pipe 37 controlled by valve 38 and is forced thence by pump 39 through pipe 41 controlled by valve 42. Fresh make-up acid of from 95-100% $H_2SO_4$ is supplied through pipe 44 controlled by valve 43 and this is blended with material supplied through pipe 41 to bring the ethylene content of the acid entering through pipe 26 down to 0.4-1.0 mol of ethylene per mol of acid, and preferably 0.7-0.9. The amount of cooling effected in the cooler 34 is also coordinated with the temperature of the fresh acid fed through pipe 44, with the result that material entering tower 23 through pipe 26 is at a temperature between 100 and 180° F. The remainder of the acid moving upward through pipe 41 is passed through pipe 6 controlled by valve 7 into the top of tower 3.

The absorption towers are preferably operated under a pressure in excess of 100 lbs. p. s. i. g. and preferably from 200-300 lbs. p. s. i. g. In practical operation the gas is supplied through pipe 1 at an initial pressure of 300 lbs. passing out through pipe 4 and into the base of tower 23 at a pressure of approximately 250 lbs. and passing out of the system through pipe 24 at a pressure established by the pressure reduction valve 25 of approximately 200 lbs.

The foregoing specific description is for purposes of illustration and not of limitation and is is therefore my intention that the invention be limited only by the appended claims or their equivalents wherein I have endeavored to claim broadly all inherent novelty.

I claim:

1. Method of absorbing ethylene in sulfuric acid to form a mixture of monoethyl and diethyl sulfates which comprises passing a first stream of gas containing inert gases consisting predominantly of ethylene, under pressure in excess of 100 lbs. p. s. i. g., upwardly through a first countercurrent contacting device in countercurrent to a descending system of sulfuric acid initially containing from 0.8-1.2 mols of ethylene per mol of sulfuric acid, at a predetermined temperature between 160-200° F., abstracting heat from said descending stream at a rate sufficient to maintain said predetermined temperature within + or −10° F., conducting away from the base of said device a stream of sulfuric acid containing from 1.3-1.5 mols of ethylene per mol of sulfuric acid, conducting away from the top of said device a second stream of gas containing from 60-80% of the ethylene content of said first stream, passing said gas upwardly through a second countercurrent contacting device in countercurrent to a descending stream of sulfuric acid initially containing from 0.4-1.0 mol of ethylene per mol of sulfuric acid initially supplied to said device at a temperature between 100-180° F., permitting the temperature of said descending stream to rise exothermally within said second device to 160-200° F. at the base thereof, withdrawing acid from the base of said second device containing from 0.8-1.2 mols of ethylene per mol of sulfuric acid, cooling same, passing a part thereof to the top of said first device and returning the remainder together with fresh sulfuric acid of from 95-100% $H_2SO_4$ to the top of said second device.

2. Process according to claim 1 in which the predetermined temperature of the descending system in said first device is between 170-190° F. and heat is abstracted therefrom at a rate sufficient to maintain said predetermined temperature within + or −5° F.

3. Process according to claim 1 in which the temperature of the descending system in said second device is permitted to rise exothermally to 170-190° F. at the base thereof.

4. Process according to claim 1 in which the predetermined temperature of the descending system in said first device is between 170-190° F., heat is abstracted therefrom at a rate sufficient to maintain said predetermined temperature within + or −5° F. and the temperature of the descending stream in said second device is permitted to rise to from 170-190° F. at the base thereof.

References Cited in the file of this patent

UNITED STATES PATENTS

| Number | Name | Date |
|---|---|---|
| 1,365,044 | Ellis | Jan. 11, 1921 |
| 2,414,737 | Heinrich | Jan. 21, 1947 |
| 2,474,588 | Morrell et al. | June 28, 1949 |
| 2,497,959 | Robey et al. | Feb. 21, 1950 |